Aug. 29, 1967 P. A. DREES 3,338,629
AUTOMOBILE UTILITY UNIT
Filed May 12, 1966
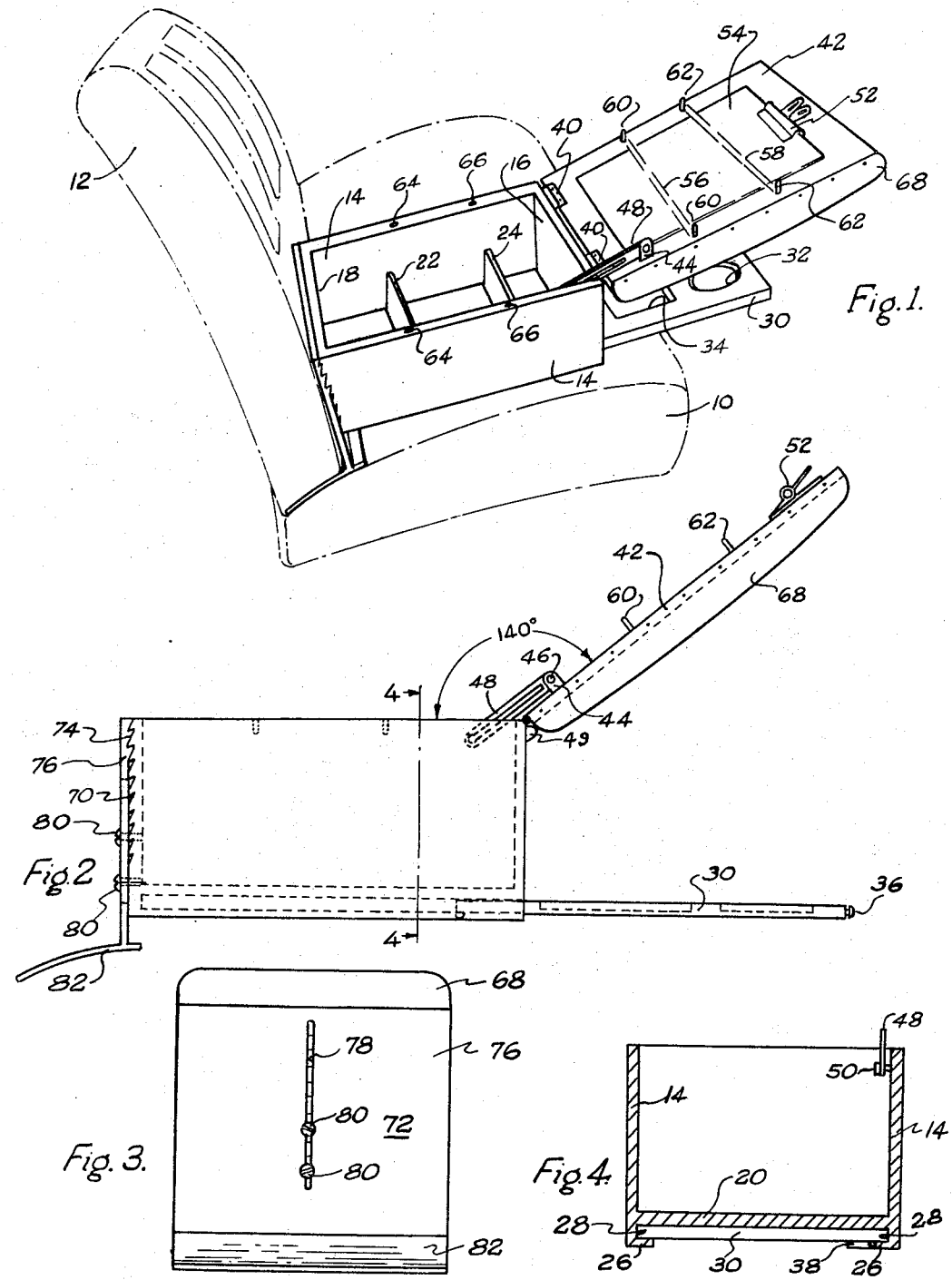

United States Patent Office 3,338,629
Patented Aug. 29, 1967

3,338,629
AUTOMOBILE UTILITY UNIT
Philip A. Drees, 13536 Janwood Lane,
Dallas, Tex. 75234
Filed May 12, 1966, Ser. No. 549,720
10 Claims. (Cl. 297—194)

ABSTRACT OF THE DISCLOSURE

An automobile utility unit adapted to be removably coupled to the seat of an automobile and adjusted to an appropriate level, including a box-shaped body adapted to be used as the utility receptacle, a cover hinged to the front of the box and swingable forwardly to an obtuse angle with respect to the box to form a writing surface, preferably having a spring clip and rubber band holders for holding sheet materials, a tray slideably mounted in the bottom of the box and slideable forwardly to serve as a table for food and other objects and an adjustable mounting means for mounting the unit on the seat.

---

The present invention relates to a utility unit for an automobile. In a more particular aspect, the present invention relates to a utility unit for an automobile which is adapted to be mounted on the seat thereof. In a more specific aspect, the present invention relates to a combined storage unit, snack tray, writing desk and arm rest adapted to be removably mounted on the seat of an automobile.

In spite of the many conveniences and improvements which have been provided for the comfort and utility of the automobile driver, there are numerous disadvantages to the utility type items now provided. For example, removable arm rests designed for the front seat of an automobile are either fixedly attached or removably attached but none have actually been adapted to fit automobiles having a wide variety of sizes and contours of seat construction. It has also been proposed to place utility packs, and particularly, map holders and the like on the sun visor or the dashboard of an automobile. However, these have not in fact been convenient and are actually a hazard, since the driver must take his eyes off the road for too long a period of time to refer to the map or to jot down a note of mileage or other information. Further, snack units have been made for attachment to the dashboard, attachment to the back of the car seat or to a certain extent built into the interior surface of a glove compartment door, but in all instances these have not been convenient to the driver. In addition, such units are not located or constructed that they can hold a cup of liquid or the like while the car is in motion. Finally, while utility units for a variety of uses, including use as an arm rest, have been provided for temporary mounting on the seat of a car, none of these units have heretofore been adjustable so that they can serve any really useful purpose except as an arm rest.

It is therefore an object of the present invention to provide an improved utility unit for an automobile.

A still further object of the present invention is to provide an improved utility unit for an automobile which is adapted to adjust to various sizes and contours of seats and temporarily mount thereon.

Another and further object of the present invention is to provide an improved utility unit for an automobile which provides a convenient writing surface.

Still another object of the present invention is to provide an improved utility unit for automobiles which provides a convenient snack tray.

A further object of the present invention is to provide an improved utility unit for an automobile which provides a storage compartment, an arm rest, a writing unit and a snack tray, all convenient to both occupants of a seat.

Still another object of the present invention is to provide an improved utility unit for an automobile which is adapted to removably mount on the seat of an automobile and is adjustable so that it may be levelled irrespective of the size or contour of the seat.

These and other objects and advantages of the present invention will be apparent from the following detailed description when read in conjunction with the drawings wherein:

FIGURE 1 is a perspective view, partially in section, of the utility unit of the present invention;

FIGURE 2 is a side elevational view of the utility unit of the present invention;

FIGURE 3 is a rear view of the utility unit of the present invention; and

FIGURE 4 is a view of the utility unit of the present invention, taken along the line 4—4 of FIGURE 2.

In accordance with FIGURE 1 the utility unit of the present invention is illustrated in place on the seat of an auto, having a bottom section 10 and a back section 12, shown in phantom. The storage portion or body portion of the utility unit comprises sides 14, front end 16 and rear or back end 18. The bottom is closed by bottom section 20. The interior of the storage compartment may be appropriately sectionalized by dividers, such as dividers 22 and 24. As shown in greater detail in FIGURE 4, sides 14 extend below bottom 20 and terminate at their lower ends in horizontal, inwardly-turned flanges 26 which extend along the entire length of the unit and form slots or slideways 28 immediately below bottom 20. Slidably mounted in slideways 28 is snack tray 30. Snack tray 30 has formed in its upper surface at least one recess 32 adapted to hold a beverage can or glass and at least one depression 34 adapted to hold other items of food. Tray 30 may be moved in and out of slideways 28 by means of pull or knob 36. A vertically-disposed tab 38 projecting from the bottom of tray 30 can be utilized to stop the forward motion of tray 30 when tab 38 strikes an appropriate pin (not shown) projecting inwardly from one of flanges 26. Hingedly mounted to front wall 16 by means of hinges 40 is cover or top 42. The interior of top 42 of the utility unit is flat and serves as a writing desk or table or map holder when top 42 is open. For this purpose, top 42 swings forwardly to an angle of about 140° and is stopped at this point so as to provide an inclined writing surface and to prevent interference of top 42 with the dashboard of the car. It is also obvious that, at this angle, the table can be quickly viewed to refer to a map in a minimum time. Accordingly, a bracket 44 is mounted on the interior of cover 42 and has a fixed stud 46 thereon which serves as a pivot for slide bracket 48. Slotted slide bracket 48 is mounted on stud 50 which is fixedly attached to the interior of side wall 14. Thus, bracket 44 and slotted bracket 48 together with studs 46 and 50 permit cover 42 to open to a predetermined inclined angle and then stop and hold the cover at this predetermined angle. Similarly, a projection or stop, such as stop 49, can be used. On the interior bottom surface of cover 42 there is preferably mounted spring clip 52. Spring clip 52 is adapted to fit within the utility compartment when cover 42 is closed and when the cover is open to hold a sheet of paper 54, a map or other appropriate writing or utility paper. Paper 54 may also be conveniently held by means of rubber bands 56 and 58 stretched across the paper on pins 60 and 62, respectively. Pins 60 and 62 are adapted to fit into apertures 64 and 66, respectively, in side walls 14. Pins 60 and 62 can, of course, be set inwardly a distance sufficient to clear side walls 14 so that apertures 64 and 66 will not be needed. However, by having the pins fit in the apertures, more stability is provided. The top surface of cover 42 is covered with padding 68 so that the utility unit may serve as an arm rest when cover 42 is closed. Rear wall 18 of the storage compartment has formed thereon, across at least a part of the back, horizontal serrations or valleys 70. Adjustably mounted against back 18 is adjusting means 72. Adjusting means 72 has formed on at least a portion thereof horizontal ridges or teeth 74 which fit into and cooperate with serrations or valleys 70 in back 18. While serrations 70 and teeth 74 are shown to extend all the way across adjusting means 72 and back 18, only a portion of the two elements need carry these serrations and teeth and the serrations and teeth need be only large enough to prevent relative movement of adjusting means 72 and back 18 when an adjustment is made. Adjusting means 72 is comprised of a vertical portion 76. Vertical portion 76 has formed therein a vertically-disposed slot 78. Passing through slot 78 and threadably mounted in back 18 are adjusting bolts 80. Adjusting bolts 80 may be turned out or loosened a sufficient amount to free teeth 74 and permit adjusting means 72 to be moved relative to back 18 of the storage compartment. Formed at the bottom of vertical portion 76 of adjusting means 72 is a rearwardly extending curved flange portion 82 which is adapted to fit between back 12 and bottom 10 of the car seat and hold the utility unit in place. Adjusting means 72 permits the utility unit and particularly tray 30 to be levelled irrespective of the configuration or size of the auto seat on which the unit is utilized. Obviously, serrations 70 can be formed adjacent the rear edge of side 14 and adjusting means 72 extended around the corner to permit adjustment from the side.

While a preferred embodiment of the present invention has been shown and specific elements illustrated and described it is obvious that numerous variations and modifications are possible without departing from the present invention. For example, the snack tray may be mounted in a variety of permanently or temporarily attached arm rests. Similarly, the writing desk can be formed on a wide variety of fixed and detachable arm rests or utility units provided they are at a convenient height and located at the middle of the seat. Accordingly, it is to be understood that the present invention is limited only by the appended claims.

I claim:
1. A utility unit for an automobile, comprising; a generally-rectangular body portion extending upwardly above the top surface of the bottom section of the seat of said automobile; a top portion hingedly attached to the front of said body and adapted to swing forwardly to an obtuse angle with respect to said body and expose a generally-flat underside of said top; a generally-flat tray means slideably mounted in said body and adapted to slide forwardly from said body; and mounting means adapted to removably mount said body on said seat of said automobile.

2. A unit in accordance with claim 1 wherein the underside of the top portion carries attaching means for attaching sheet material thereto and holding the same on said flat surface.

3. A unit in accordance with claim 2 wherein the attaching means is a spring clip mounted on the flat surface adjacent the free end of the top portion.

4. A unit in accordance with claim 2 wherein the attaching means include at least two upstanding pins spaced on either side of the flat surface of the top portion and adapted to hold an elastic band.

5. A unit in accordance with claim 1 wherein the mounting means includes a rearwardly extending flange adapted to fit between the top and the bottom sections of the seat.

6. A unit in accordance with claim 5 wherein the mounting means is adjustable to level the body portion on the seat.

7. A unit in accordance with claim 1 wherein the top side of the top portion is padded and forms a padded arm rest when said top portion is swung rearwardly.

8. A unit in accordance with claim 1 wherein the body portion is hollow and forms a storage compartment.

9. A unit in accordance with claim 1 wherein the tray has at least one depression formed in its upper surface to hold a loose item and prevent said item from sliding off said tray.

10. A unit in accordance with claim 1 wherein the mounting means is adjustable to level the body portion on the seat.

References Cited

UNITED STATES PATENTS

| | | | |
|---|---|---|---|
| 2,678,682 | 5/1954 | Thomas | 297—194 |
| 2,807,908 | 10/1957 | Lykes | 248—451 |
| 2,853,349 | 9/1958 | Wilcox | 312—330 X |
| 3,061,370 | 10/1962 | Murphy | 312—235 X |
| 3,083,998 | 4/1963 | Morris | 297—194 |
| 3,104,131 | 9/1963 | Krone | 312—235 |
| 3,207,567 | 9/1965 | Brady | 312—235 |
| 3,279,872 | 10/1966 | Howke | 312—235 |

DAVID J. WILLIAMOWSKY, *Primary Examiner.*

JAMES T. McCALL, *Examiner.*